B. F. GOLD.
Cooking Stove.
No. 32,829.
2 Sheets—Sheet 1.
Patented July 16, 1861.
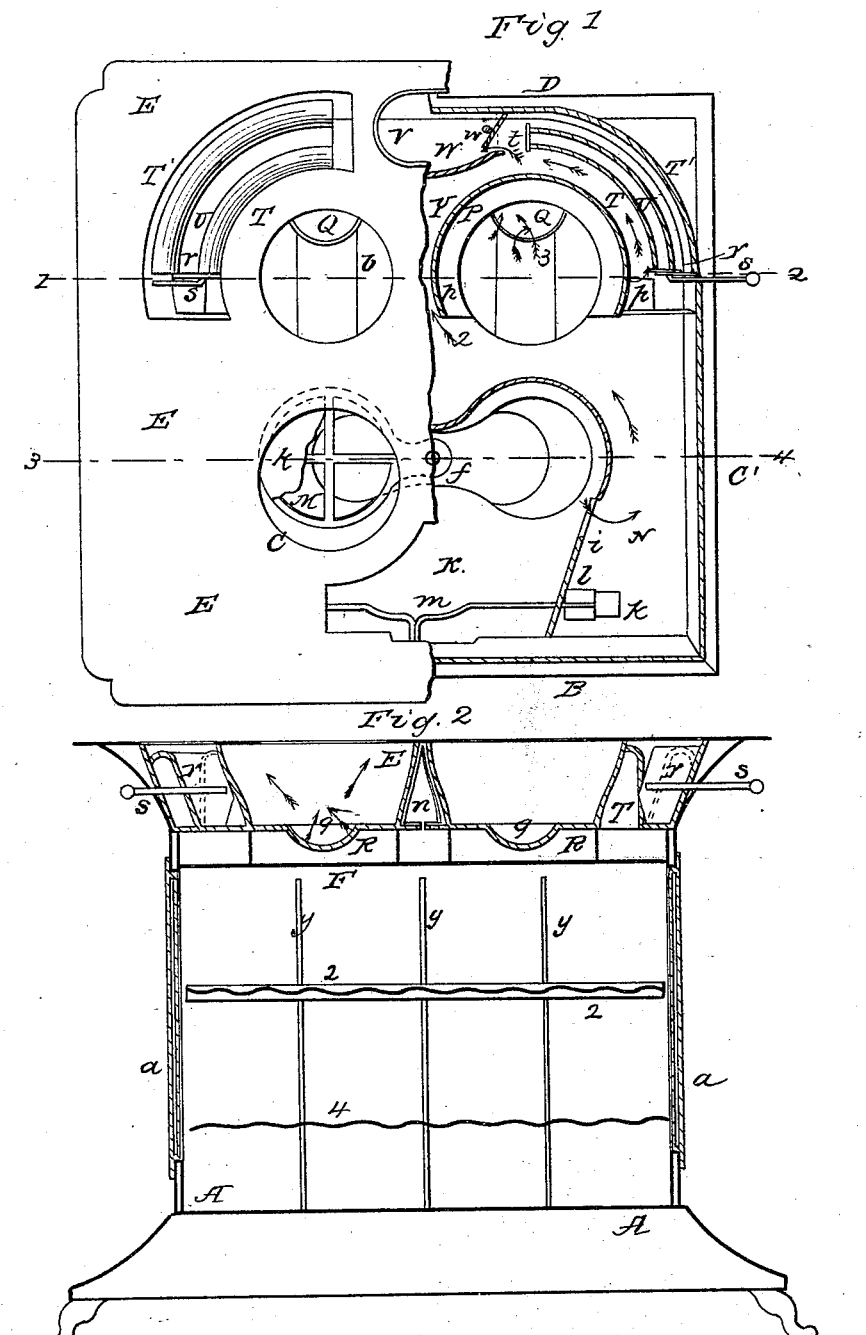

B. F. GOLD.
Cooking Stove.
No. 32,829.
2 Sheets—Sheet 2.
Patented July 16, 1861.
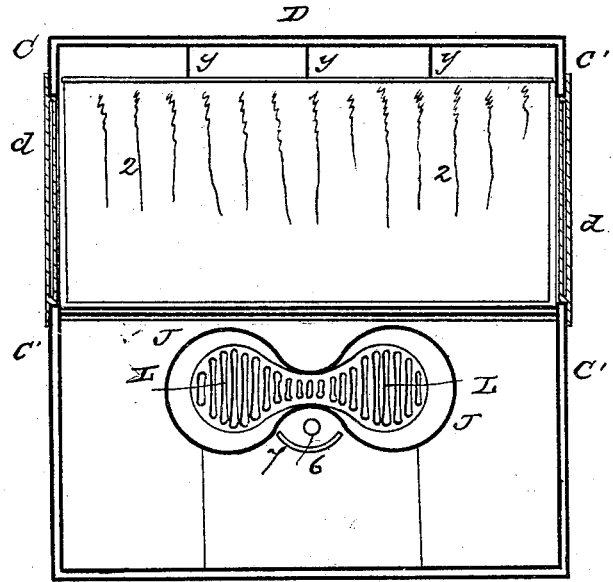
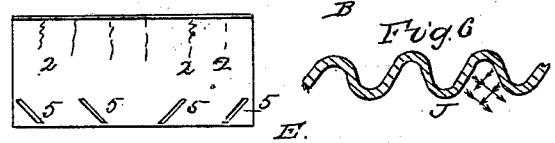
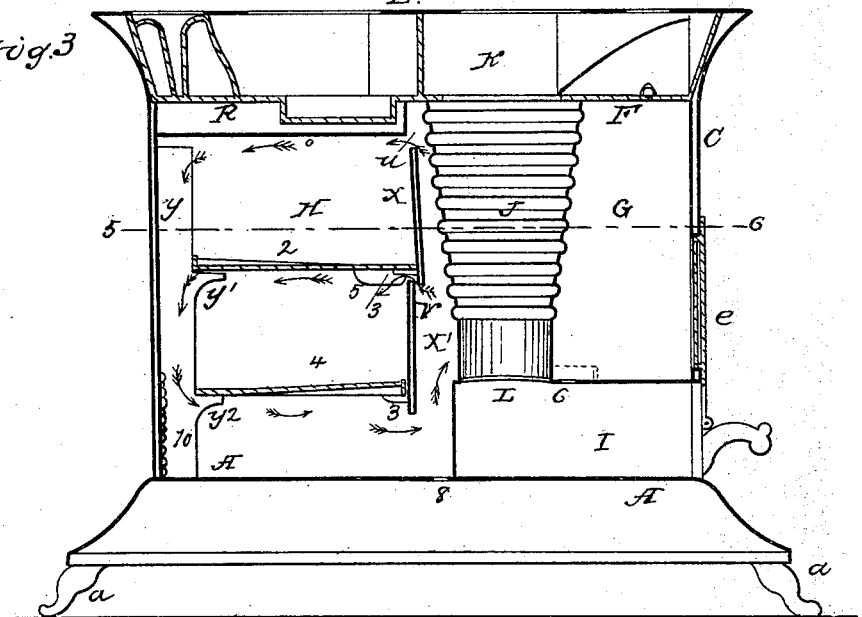
Witnesses
Chas Howson.
Charles E Foster
Inventor
Henry Howson
Atty for B.F. Gold

UNITED STATES PATENT OFFICE.

BENJAMIN F. GOLD, OF READING, PENNSYLVANIA.

COOKING-STOVE.

Specification of Letters Patent No. 32,829, dated July 16, 1861.

*To all whom it may concern:*

Be it known that I, BENJAMIN F. GOLD, of Reading, Pennsylvania, have invented certain Improvements in Cooking-Stoves; and I do hereby declare the following to be a full, clear, and exact description of the same, reference being had to the accompanying drawing and to the characters of reference marked thereon.

My invention consists firstly in an arrangement substantially as described hereafter of an oven chamber, hot air chamber, and fire pot, the whole being inclosed by double plates packed with nonconducting material. Secondly in a regulating damper arranged in front of the stove in respect to the fire chamber, oven and flues, as specified hereafter. Thirdly in certain fenders packed with nonconducting material and certain shelves, the whole being arranged substantially as described hereafter within the oven chamber in respect to each other and the fire-pot. Fourthly making the shelves with corrugations increasing in width and depth. Fifthly in certain deflectors situated beneath the upper oven shelf. Sixthly in a peculiar construction of fire pot described hereafter. Seventhly in a device for drying the air preparatory to its admission beneath the grate for supporting combustion. Eighthly in certain flues with an intervening space packed with non-conducting material. Ninthly, in certain plates of peculiar form and peculiarly arranged in respect to the rear and front boiler holes of the stove.

In order to enable others skilled in the art to make and use my invention I will now proceed to describe its construction, operation and the object of the various improvements.

On reference to the accompanying drawing which forms a part of this specification, Figure 1 is a plan view (partly in section) of my improved cooking stove, Fig. 2 a transverse vertical section on the line 1, 2, Fig. 1, Fig. 3 a vertical section on the line 3, 4 Fig. 1, Fig. 4 a sectional plan on the line 5, 6 Fig. 1, Fig. 5 an inverted plan view of one of the oven shelves, and Fig. 6 an enlarged sectional view of part of the fire pot.

Similar characters refer to similar parts throughout the several views.

A is the base plate of the stove furnished with suitable legs *a* and to this plate are secured the front plate B, the opposite side plates C and C', and the rear plate D the whole being surmounted with the cover plate E in which are the two rear boiler holes *b* and front boiler holes *c*. The bottom plate consists of a single thickness of metal but the side, front, and rear plates consist of two sheets of metal with a narrow intervening space which is tightly packed with calcined gypsum or other suitable noncombustible and nonconducting material, the oven doors *d* as well as the top of the oven likewise consisting of two plates the space between which is packed in the same manner as the front, rear, and side plates of the stove.

Beneath the cover plate E is another plate F and the space between the latter and the base plate is divided into three compartments namely the hot air chamber G the oven chamber H and the ash pit I. The hot air chamber is provided in front with a door *e* packed in the same manner as the oven doors, and this chamber contains the fire pot J which consists of two hollow cylinders arranged in respect to and communicating with each other from top to bottom as best observed on reference to the sectional plan Fig. 4 the sides of the fire-pot being inclined as seen in Fig. 3 so that it may be larger at the top than the bottom. The upper edge of the fire pot is attached to the plate F and communicates through circular openings in the said plate with the fuel chamber K the lower edge of the fire pot being attached to the top plate of the ash box at which point the grate L is situated.

It will be observed that the sides of the fire pot are corrugated horizontally throughout with the exception of a portion of the lower end which has vertical corrugations. The object of these corrugations will be rendered apparent hereafter. It will also be observed that the two hollow cylinders which compose the fire pot are so situated that one cylinder shall be directly below one front boiler hole *c* of the cover plate E the other cylinder being directly below the other boiler hole of the same plate.

At a point midway between the two front boiler holes of the cover plate E and consequently between the two cylinders of the fire-pot is situated a vertical spindle *f* see Fig. 1 turning at the bottom in the plate F and at the top in the plate E above which the spindle is provided with such appliances as to be readily turned at pleasure. To this spindle is hung a circular frame M arranged to receive a plate $h$ of soapstone or other equivalent material the frame being of such a size and so situated in respect to the fire pot that it can be turned to a position to cover one or other of the cylinders which compose the said fire pot.

Fuel is admitted to the chamber K through an opening in the cover plate E and is maintained within proper bounds laterally by means of guards or shields $i, i$.

A plate $j$ extends in a curved direction from the plate F to the cover plate E and is curved so as to inclose the rear and sides of the openings in the plate F which communicates with the fire pot so that the products of combusition from the fuel in the latter must pass in the direction shown by the arrow Fig. 1 between the shield $i$ and the end of the plate $j$ into the first flue N. Each of the latter flues has an opening $k$ communicating with the hot air chamber G each opening being provided with a valve or damper $l$ connected to a rod $m$ by operating which from the exterior of the stove the openings $k$ may be obstructed at pleasure.

Two curved plates P extend from the plate F to the cover plate E one of these plates being situated concentrically with each of the rear boiler holes $b$ of the said cover plate as seen in Fig. 1 so that the products of combustion to the first flue N must necessarily pass either in the direction of the arrow 2 between the two plates P or in the direction of the arrows 3 downward through the opening Q into what I term the second flue R seen in Figs. 2 and 3. It should be understood that the opening between the two plates P may be obstructed at pleasure by means of a valve $n$ best observed on reference to Fig. 2. This second flue R communicates on each side of the stove through an opening $p$ and in the center through an opening $p'$ with the space outside the curved plates P, this space comprising the central flue Y and two opposite curved side flues T. Outside of each of the latter flues is another flue T' and between this flue and the flue T intervenes a space packed with any suitable non-conducting material U. The front ends of the flues T and T' are provided with a valve $r$ so connected to the rod $s$ that the entrance to the flue T' may be closed or allowed to remain open, there being in either case always a free passage for the products of combustion through the other flue T.

In the rear of the cover plate E is the opening V through which the products of combustion pass into the pipe which communicates with the chimney. Beneath this opening V is a curved plate W and between the latter and the end of the flue T is an opening $t$ through which the products of combustion pass to the chimney when the valve $w$ is open.

The oven chamber H is separated from the fire chamber G by two plates or fenders X and X' which consist of two sheets of metal with an intervening space packed in the same manner as the side front and rear plates of the stove, these plates being so arranged that there is an opening $u$ between the upper edge of the plate X and the top of the oven, an opening $v$ between the two plates, and a free communication between the fire chamber and the lower portion of the oven chamber below the edge of the plate X'.

On the inside of the rear plate D of the stove are vertical ribs $y$ having projections $y'$ one edge of the upper oven shelf 2 resting on these projections and the opposite edge on the projections 3 on the back of the plate X'. One edge of the lower oven shelf 4 rests on similar projections 3 on the plate X' the opposite edge resting on the projections $y^2$ of the ribs $y$. The upper shelf 2 is corrugated as best observed on reference to Figs. 2 and 4 the corrugations increasing in depth and width from the front toward the rear edge of the shelf on the underside of which are deflectors 5, Fig. 5, the object of which will be alluded to hereafter. The lower oven shelf is corrugated in the same manner as the upper shelf, the corrugations however increase in width and depth from the rear toward the front end of the shelf.

The object of the corrugated tapering fire pot J is three fold, firstly it is not liable to burn, secondly a greater amount of radiated heat is obtained from it than from a plain fire pot, and this at the expense of a smaller amount of fuel; thirdly the corrugations enable the fire pot to expand and contract freely without breaking so that the usual fire brick lining (which in other stoves absorbs a great portion of the heat) may be dispensed with. The corrugations should be made of the form represented in Fig. 6 so that the heat radiated from one corrugation cannot be intercepted by the adjacent corrugation. The fire pot being of a tapering form the fuel as it is consumed and diminishes in bulk is always maintained in a compact mass in all parts of the furnace, thus maintaining an equal or nearly equal heat throughout, the vertical corrugations at the bottom of the fire pot affording channels for the free passage of the cinders and ashes to the grate L. By making the fire pot of two cylinders communicating with each other or in other words by contracting the fire pot in the middle as seen in Fig. 4 the main body of the fuel is maintained in the most advantageous position, that is directly under the front boiler holes, there being comparatively little fuel between these points.

The object of the frame M with its soapstone plate is in order that one or other of the two cylinders composing the fire pot may be covered at pleasure thereby rendering the heat beneath one or other of the boiler holes less intense, or reducing the heat throughout one side of the stove to any required degree and augmenting it upon the other side. This is done by closing the damper on that side to which the frame M is turned so that all cooking which requires haste may be upon one side, and that which requires a check upon the other.

It will be observed on reference to Fig. 3 that there is an orifice or orifices 8 in the base plate immediately in the rear of the ash box and that in the top of the latter, immediately in front of the fire pot, is another orifice 6 in front of which is a curved shield 7. It is well known that when air is introduced in a damp state to the fuel beneath the grate its action has a tendency to retard combustion. In order to avoid this injurious effect, when the atmosphere is damp, I close the ash pit door, when the air for supporting combustion will pass through the orifices 8, will be brought in contact with the lower end of the fire pot where it becomes thoroughly dried before it passes through the opening 6 into the ash box and thence through the gate to the fuel, the shield 7 preventing the air from passing into the ash box before it has been brought into contact with the fire pot. When the fuel is ignited in the first instance the valve or damper $n$ Fig. 2 is opened, when the products of combustion will pass laterally into the first flue N as shown by the arrow, thence around the plate $j$, at the rear of the fire pot, thence through the open space between the plates P and thence through the openings $t$ to the pipe leading to the chimney, the products of combustion being maintained in this comparatively direct course until the fuel is fully ignited. After this the valve $n$ is closed when the products of combustion will pass down the openings Q into what I have termed the second flue R, when they will take an angular direction some to the right and others to the left toward the openings $p$ and $p'$ and through the latter into the flues T and Y and thence through the opening $t$ into the chimney. The object of this arrangement is a thorough equalization and increase of the heat beneath the boiler holes, this equalization being effected as follows: It will be observed on reference to Fig. 2 that the curved plates P beneath the rear boiler holes are inclined or beveled outward from the lower edge upward and that there is a depression $q$ in that part of the plate which forms the bottom of the space partly inclosed by the curved plates P, this depression being in a line with the opening Q through which the products of combustion dive from the first into the second flue R. It will be evident that the inclination of the plates P allows both for a greater amount of heat and a more equal distribution of that heat to the upper plate of the stove in the neighborhood of the rear boiler holes. The depressions $q$ also cause an increased heat to be imparted to the upper plate of the stove as the products of combustion after passing downward through the openings Q will be dispersed laterally equally in both directions by the projections formed by the depressions and the heat imparted to the latter will be radiated in the angular directions pointed out by the arrows Fig. 2 and thereby distributed equally throughout the surface of the upper plate in the neighborhood of the boiler holes.

The object of the two flues T and T' with an intervening space V packed with nonconducting material is in order that in the summer months the products of combustion may by closing the valve $r$ be allowed to pass through the flue T only, thus maintaining the exterior of the stove comparatively cool, in the winter months however a portion of the products of combustion is allowed to pass through the flue T' so that considerable heat may be imparted to the exterior of the stove. The heat from the fire pot (Fig. 3) passes into the oven chamber through the upper opening $v$ impinging against the top of the oven and against the underside of the upper shelf 2. The heated air being partly absorbed by the articles of diet in the oven becomes heavier and passes down the back of the oven between the ribs $y$ and back again beneath the lower oven shelf into the fire chamber where it becomes reheated preparatory to taking the same course which is pointed out by the arrows. The heated air passing through the opening $v$ is dispersed laterally by the deflectors 5 (Fig. 5) on the underside of the upper shelf 2 so that the heat throughout the whole surface of the latter may be equalized. The most intense heat however is imparted to the shelf at the edge nearest the openings $v$, but owing to the corrugations which as before remarked increase in width and depth from near this edge to the rear edge of the shelf the heating surface increases from near the front to the rear edge, and consequently the heat imparted to the shelf is equalized throughout. In like manner the greatest heat of the lower shelf 4 is nearest its rear edge, but owing to the corrugations of that shelf the heat is distributed equally throughout the increased surface being from rear to front.

At the back of the oven chamber are a series of horizontal corrugations or flutings 10 (Fig. 3), extending from the bottom plate A of the stove to the height or thereabout of the lower shelf, these flutings being of such a form that the heat will be radiated against the underside of the lower shelf thus increasing the heat at this point where it is required, as it would otherwise be the coolest part of the oven; similar flutings may be situated at the side of the oven near the doors as well as on the top.

It will be seen that the oven chamber is heated by radial heat, from the fire pot alone, and not by a system of flues for the passage of the products of combustion to the chimney as in ordinary stoves; this heat is retained within the oven by the non-conducting material packed between the double plates, the heat obtained by the passage of the products of combustion to the chimney being used for imparting the required heat to the upper plate of the stove. When the heat of the oven becomes too intense the regulating dampers $l$ are opened so as to allow the superfluous heat to pass into the flues and thence to the chimney thereby increasing the heat of the upper plate.

The hot air chamber G may be used for various culinary purposes such as the roasting of joints of meat which may be suspended from the upper plate F by any suitable appliances the fumes arising from such cooking being allowed to pass through the opening K into the flues.

The border of the top plate E extending from the outside of this plate to the inside of the flues N and T on both sides or on all sides of the stove is shielded from the heat by making it double in the same manner as the sides of the stove and packing the space with non-conducting material. The object of this border is to form a hearth on which to deposit the cooked articles of diet immediately before they are sent to the table thus enabling me to dispense with the usual projecting hearth. In order to enlarge this hearth room there may be a border one inch wide or thereabout resting on and riveted to a depression at the edges of the plate E the said depression being as deep as the border is thick. That this appended border may not acquire a scorching heat it rests on two rows of points which may be placed on the depression about one inch apart from each other and the outer edge may have perforations about one fourth of an inch in diameter and one fourth of an inch apart from each other.

I claim as my invention and desire to secure by Letters Patent—

1. The arrangement substantially as herein described of the oven chamber H, hot air chamber G and fire pot J, the whole being inclosed by double plates packed with suitable non-conducting material as set forth for the purpose specified.

2. The regulating dampers $l$ arranged in front of the stove in respect to the fire chamber, and oven, and the flues above the same as specified.

3. The fenders X and X' packed with non-conducting material and the shelves 2 and 4, the whole being arranged within the oven chamber in respect to each other and the fire pot substantially as set forth.

4. Making the shelves with corrugations increasing in width and depth for the purpose specified.

5. The deflectors 5 on the underside and near the front edge of the upper shelf for the purpose described.

6. The tapering fire pot J composed of two cylinders communicating with each other from top to bottom, said fire pot having horizontal corrugations of the form described and being arranged within the fire chamber in respect to the oven chamber, and front boiler holes as set forth.

7. The opening or openings 8 in the bottom plate of the stove, and the opening 6 in the ash pit said openings being arranged in respect to each other on the fire pot as and for the purpose specified.

8. The flues T and T' with an intervening packing of non conducting material in combination with a regulating damper $r$ for the purpose specified.

9. The plates P and $j$ extending in a curved direction from the plate F to the cover plate E and otherwise arranged in respect to the front and rear boiler holes as herein set forth.

In testimony whereof, I have signed my name to this specification, in the presence of two subscribing witnesses.

BENJAMIN F. GOLD.

Witnesses:
HENRY HOWSON,
E. PINCERS.